(12) United States Patent
Lepine et al.

(10) Patent No.: US 12,601,377 B2

(45) Date of Patent: Apr. 14, 2026

(54) SUSPENSION BEARING UNIT WITH GASKET

(71) Applicant: AKTIEBOLAGET SKF, Gothenburg (SE)

(72) Inventors: Thomas Lepine, Tours (FR); Paul Rabourdin, Chambray lès Tours (FR); Jordan Renaudon, Saint Cyr sur Loire (FR); Bruno Montboeuf, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 76 days.

(21) Appl. No.: 18/617,698

(22) Filed: Mar. 27, 2024

(65) Prior Publication Data

US 2024/0344566 A1 Oct. 17, 2024

(30) Foreign Application Priority Data

Apr. 12, 2023 (FR) ...................................... 2303605

(51) Int. Cl.
| | |
|---|---|
| *F16C 33/76* | (2006.01) |
| *F16C 35/06* | (2006.01) |
| *B60G 11/16* | (2006.01) |

(52) U.S. Cl.
CPC ............ *F16C 33/768* (2013.01); *F16C 35/06* (2013.01); *B60G 11/16* (2013.01); *B60G 2204/124* (2013.01); *B60G 2204/418* (2013.01); *F16C 2326/05* (2013.01)

(58) Field of Classification Search
CPC .... F16C 19/16; F16C 19/163; F16C 33/6618; F16C 33/761; F16C 33/7886; B60G 2204/128; B60G 2204/418
See application file for complete search history.

(56) References Cited

U.S. PATENT DOCUMENTS

| | | |
|---|---|---|
| 8,506,171 B2 | 8/2013 | Stautner et al. |
| 9,856,917 B1 | 1/2018 | Vidyasagar et al. |

(Continued)

FOREIGN PATENT DOCUMENTS

| | | |
|---|---|---|
| CN | 102434575 A | 5/2012 |
| DE | 202010008769 U1 | 1/2012 |

(Continued)

OTHER PUBLICATIONS

Preliminary Search Report from the French Patent Office dated Sep. 30, 2023 in related French application No. FR2303605, including Search Report and Written Opinion.

(Continued)

*Primary Examiner* — John Olszewski
*Assistant Examiner* — Aimee Tran Nguyen
(74) *Attorney, Agent, or Firm* — J-TEK LAW PLLC; Scott T. Wakeman; Mark A. Ussai

(57) ABSTRACT

A suspension bearing unit includes a lower support cap, an upper bearing cap having an axial skirt, and at least one bearing disposed radially between the lower support cap and the upper bearing cap. At least one gasket is at least partially disposed in a space radially between the axial skirt and the at least one bearing and secured to the upper bearing cap or to the lower support cap. The gasket includes a sealing portion, and the sealing portion has at least one recess which may contain a lubricant. When the gasket is secured to the upper bearing cap, the sealing portion seals against a portion of the lower support cap, and when the gasket is secured to the lower support cap the sealing portion seals against a portion of the upper bearing cap.

9 Claims, 6 Drawing Sheets

(56)        References Cited

U.S. PATENT DOCUMENTS

| | | | |
|---|---|---|---|
| 10,518,598 B1 | 12/2019 | Shaikh et al. | |
| 11,168,738 B2 * | 11/2021 | Yan | F16C 33/80 |
| 11,958,235 B2 | 4/2024 | Dudley et al. | |
| 2011/0311177 A1 | 12/2011 | Viault et al. | |
| 2013/0277161 A1 | 10/2013 | Bussit et al. | |
| 2015/0247533 A1 * | 9/2015 | Fickert-Guenther | F16J 15/002 |
| | | | 384/480 |
| 2018/0372152 A1 | 12/2018 | Gaultier et al. | |
| 2021/0222732 A1 | 7/2021 | Blanchard et al. | |
| 2024/0344566 A1 | 10/2024 | Lepine et al. | |

FOREIGN PATENT DOCUMENTS

| | | | | |
|---|---|---|---|---|
| DE | 102012208056 A1 * | 11/2013 | | F16C 33/7846 |
| DE | 102017204818 A1 | 9/2018 | | |
| DE | 102020201404 A1 | 8/2021 | | |
| DE | 102020202617 A1 * | 9/2021 | | B60G 15/067 |
| EP | 3626486 A1 | 3/2020 | | |
| FR | 3103018 A1 | 5/2021 | | |
| JP | 2021143734 A * | 9/2021 | | F16C 33/761 |

OTHER PUBLICATIONS

Unpublished U.S. Appl. No. 18/617,720, first named inventor: Thomas Lepine, filing date: Mar. 27, 2024.
Unpublished U.S. Appl. No. 18/617,954, first named inventor: Thomas Lepine, filing date: Mar. 27, 2024.
Office Action from the United States Patent Office mailed Jul. 1, 2025 in related U.S. Appl. No. 18/617,720.
Office Action from the United States Patent Office mailed Mar. 27, 2024 in related U.S. Appl. No. 18/617,954.

* cited by examiner

SUSPENSION BEARING UNIT WITH GASKET

CROSS-REFERENCE

This application claims priority to French patent application no. 2303605 filed on Apr. 12, 2023, the contents of which are fully incorporated herein by reference.

TECHNOLOGICAL FIELD

The present disclosure is directed to suspension bearing units used in particular in the suspension struts of the steered wheels of motor vehicles.

BACKGROUND

A suspension bearing unit generally comprises an axial thrust bearing and upper and lower caps that form a housing for the rings of the bearing and that provide an interface between the rings and neighboring elements.

A suspension bearing unit is generally disposed in an upper part of the suspension strut between a suspension spring and a bodyshell of the vehicle. The suspension spring is mounted around a shock-absorber piston rod, the end of which is connected to the bodyshell of the vehicle. The suspension spring, of the helical spring type, bears axially, directly or indirectly, on the lower cap of the suspension bearing unit.

The suspension bearing unit makes it possible to transmit axial and radial loads between the suspension spring and the bodyshell of the vehicle while still allowing a relative rotational movement between the lower cap and the upper cap arising from a turn of the steered wheels of the vehicle and/or from the compression of the suspension spring.

In general, the upper cap of the suspension bearing unit is provided with a plurality of hooks that are disposed on an external skirt and are designed to diametrically engage with a plurality of hooks of the lower cap. The hooks of each cap are spaced from one another in the circumferential direction.

The hooks form retaining means for axially retaining the upper and lower caps in relation to one another. These hooks also form narrow passages in order to limit the intrusion of contaminating particles radially between the external skirt of the upper cap and the lower cap.

However, such a suspension bearing unit is generally exposed to various types of contamination.

Specifically, the contaminating particles can easily infiltrate between the external skirt of the upper cap and the lower cap and then be directed towards the bearing and introduced into the latter.

To overcome this drawback, patent application DE-A1-10 2020 201 404 discloses the provision of an external gasket which is fixed by clamping between the bearing and the lower cap of the suspension bearing unit and is provided with at least one sealing lip that interacts with the upper cap.

SUMMARY

The disclosure is directed to a suspension bearing unit comprising a lower support cap, an upper bearing cap, at least one bearing disposed between the caps, and at least one gasket disposed radially at least partially between a skirt of the upper bearing cap and the bearing.

The gasket is secured to one of the lower support cap and upper bearing cap and is provided with a sealing portion that extends in the direction of the other cap.

According to a general feature, at least one recess is formed on the sealing portion of the gasket and is open towards the other cap, the recess being filled with lubricant so as to form a seal with the other cap. The recess of the lubricant-filled sealing portion ensures sealing between the sealing portion of the gasket and the other cap by forming a barrier that stops the contaminating particles that move towards the bearing. In addition, the lubricant reduces rubbing between the sealing portion of the gasket and the other cap, thereby reducing the wear of the gasket and the friction torque of the bearing unit.

The expression "gasket secured to one of the lower support cap and upper bearing cap" is understood to mean that the gasket is fixed relative to the cap. The gasket may be an attached piece fixed on the cap, or alternatively the gasket may be made in a single piece with the cap by molding or else by overmolding on the cap.

According to a first embodiment, the sealing portion of the gasket remains at a distance from the other cap. In this case, only the lubricant comes into contact with the other cap.

According to an alternative second embodiment, the sealing portion of the gasket may bear against the other cap.

Advantageously, the recess of the sealing portion of the gasket is annular. This further improves the sealing of the bearing unit insofar as the lubricant can form a bead around 360°.

Advantageously, the sealing portion of the gasket comprises an axial skirt which radially surrounds the recess. The axial skirt forms a barrier for stopping the contaminating particles before they reach the recess of the sealing portion of the gasket. The service life and the effectiveness of the lubricant are thus improved. Optionally, the sealing portion of the gasket extends purely axially.

In one embodiment, the recess of the sealing portion of the gasket is open both radially and axially with respect to the other cap, the recess being formed at a free end of the sealing portion.

The sealing portion of the gasket may comprise at least one bead protruding radially towards the other cap, the bead at least partially delimiting the recess.

In a particular embodiment, the unit comprises at least first and second recesses that are formed on the sealing portion of the gasket and are filled with lubricant, the second recess being axially offset with respect to the first recess on the side of the cap and radially offset with respect to the first recess on the side of the other cap, the first and second recesses immediately following one another in the axial direction. The first and second lubricant-filled recesses further improve the sealing between the sealing portion of the gasket and the other cap.

As indicated previously, the gasket may be overmolded on the cap. As an alternative, the gasket may be fixed on the cap by any other suitable means.

Advantageously, the gasket comprises an annular heel secured to the cap, the sealing portion extending from the annular heel.

Advantageously, the free end of the skirt of the upper bearing cap is axially downwardly offset with respect to the free end of the sealing portion of the gasket.

According to a first variation, the gasket is disposed radially at least partially between the bearing and an external skirt of the upper bearing cap which radially surrounds the gasket. The gasket thus forms an external gasket.

As an alternative, according to a second variation, the gasket is disposed radially between the bearing and an internal skirt of the bearing cap which extends at least partially into the bore of the support cap. The gasket thus forms an internal gasket.

According to a third variation, the device comprises both an external gasket and an internal gasket as described above.

Advantageously, the sealing portion of the gasket allows an annular space to remain between the recess and the other cap.

BRIEF DESCRIPTION OF THE FIGURES

The present invention will be better understood on studying the detailed description of embodiments, given by way of non-limiting example and illustrated by the appended drawings, in which.

DETAILED DESCRIPTION

Figure 1:
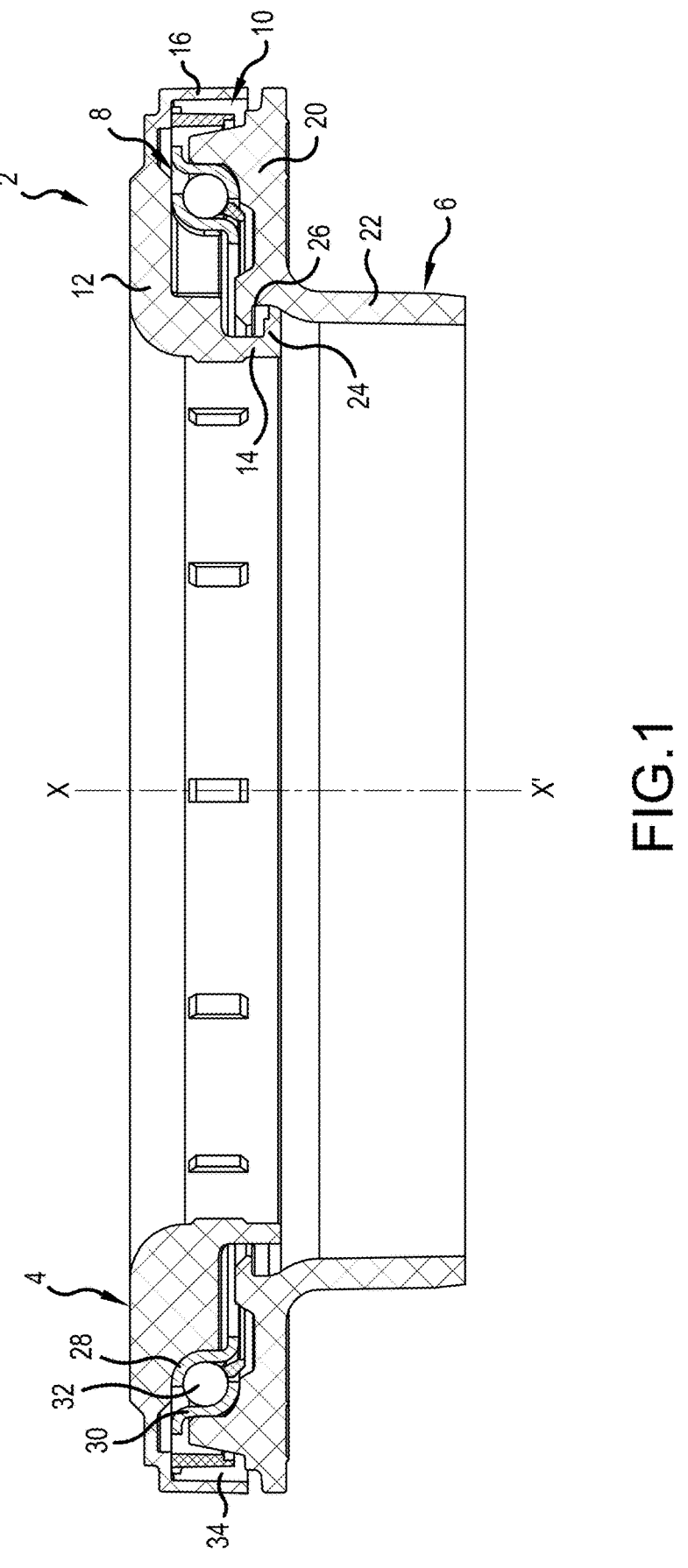
FIG. 1 is an axial sectional view of a suspension bearing unit according to a first exemplary embodiment of the disclosure.

The suspension bearing unit 2 shown in FIG. 1 is suitable for installation between a cup or upper bearing seat coming into contact with a fixed chassis element of a motor vehicle and a suspension spring of the helical type. In FIG. 1, the unit 2 is shown in an assumed vertical position.

The unit 2, of axis X-X', comprises an upper bearing cap 4, a lower support cap 6, and a rolling bearing 8 interposed axially between the caps 4, 6.

In the example illustrated, the upper bearing cap 4 and the lower support cap 6 are mounted in direct contact with the bearing 8 without an interposed intermediate element. In a variant, the upper bearing cap 4 and the lower support cap 6 may be mounted in indirect contact with the bearing 8 with an interposed intermediate element.

As will be described in more detail later on, the unit 2 moreover comprises an external annular gasket 10 for preventing the intrusion of contaminants towards the bearing 8.

In the example illustrated, the gasket 10 is fixed on the upper bearing cap 4 and extends towards the lower support cap 6. The gasket 10 may be fixed on the upper bearing cap 4 by any suitable means, for example by axial and/or radial interference with the upper bearing cap 4, by adhesive bonding, by overmolding, etc.

The upper bearing cap 4 may advantageously consist of a single piece, for example made of plastics material, for example such as polyamide PA 6.6, which may be reinforced with glass fibers or not.

The upper bearing cap 4, of axis X-X', comprises a radial portion 12, an annular axial internal skirt 14, and an annular axial external skirt 16 radially surrounding the internal skirt 14.

The radial portion 12 of the upper bearing cap 4 has an upper surface (not provided with a reference sign) intended to come to face the upper bearing seat, and an opposite lower surface (not provided with a reference sign) in contact with the bearing 8. The upper and lower surfaces define the thickness of the radial portion 12 of the upper bearing cap 4. In the example illustrated, the radial portion 12 of the upper bearing cap 4 has a stepped form. In the example illustrated, the gasket 10 is fixed on the radial portion 12 of the upper bearing cap 4.

The external skirt 16 of the upper bearing cap 4 partially radially surrounds the lower support cap 6, the external skirt 16 extending axially from the radial portion 12 of the upper bearing cap 4. In the example illustrated, the external skirt 16 of the upper bearing cap 4 continues a large-diameter edge of the radial portion 12 of the upper bearing cap 4. The external skirt 16 radially surrounds the gasket 10.

The internal skirt 14 of the upper bearing cap 4 extends inside the bore of the lower support cap 6. The internal and external skirts 14, 16 of the upper bearing cap 4 extend axially downwards from the radial portion 12 of the upper bearing cap 4. The internal skirt 14 continues a small-diameter edge of the radial portion 12 of the upper bearing cap 4.

The lower support cap 6, of axis X-X', comprises an annular radial portion 20 in the form of a plate, and an annular axial skirt 22 continuing a small-diameter edge of the radial portion 20 of the lower support cap 6.

The skirt 22 of the lower support cap 6 extends axially away from the upper bearing cap 4 and the bearing 8. The skirt 22 of the lower support cap 6 makes it possible to center the suspension spring.

The radial portion 20 of the lower support cap 6 has a lower annular radial surface delimiting a bearing surface for the suspension spring.

The upper bearing cap 4 comprises a plurality of internal hooks 24 that are disposed on the internal skirt 14 of the upper bearing cap 4 and extend radially outwards in the direction of the lower support cap 6. In the example illustrated, the hooks 24 are spaced from one another in the circumferential direction. In a variant, it could be possible to provide a single annular hook 24.

The lower support cap 6 comprises a plurality of internal hooks 26 that are disposed on the radial portion 20 of the lower support cap 6 and extend radially inwards in the direction of the upper bearing cap 4, the plurality of internal hooks 26 being designed to diametrically engage with the plurality of internal hooks 24 of the upper bearing cap 4. In a variant, it could be possible to provide a single annular hook 26.

The hooks 24, 26 form retaining means for axially retaining the upper bearing cap 4 and lower support cap 6 in relation to one another.

The bearing 8 is situated entirely radially between the skirts 14, 16 of the upper bearing cap 4. The bearing 8 comprises an upper ring 28 in contact with the upper bearing cap 4, a lower ring 30 in contact with the lower support cap 6, and a row of rolling elements 32, in this case balls, that are disposed between the raceways formed on the rings 28, 30. In the example illustrated, the rolling bearing is of the angular contact type. The upper ring 28 is in contact with the lower surface of the radial portion 12 of the upper bearing cap 4. The lower ring 30 is in contact with an upper surface of the lower support cap 6, the upper surface having a complementary shape to the lower ring 30 of the bearing 8.

The lower support cap 6 in this case consists of a body formed in a single piece, for example made of plastics material, for example such as polyamide PA 6.6, which may be reinforced with glass fibers or not.

There is an annular radial space 34 between the lower support cap 6 and the external skirt 16 of the upper bearing cap 4.

The gasket 10 is annular and radially surrounds the lower support cap 6. The gasket 10 is mounted radially around the bearing 8 and the outer surface of the lower support cap 6.

Figure 2:
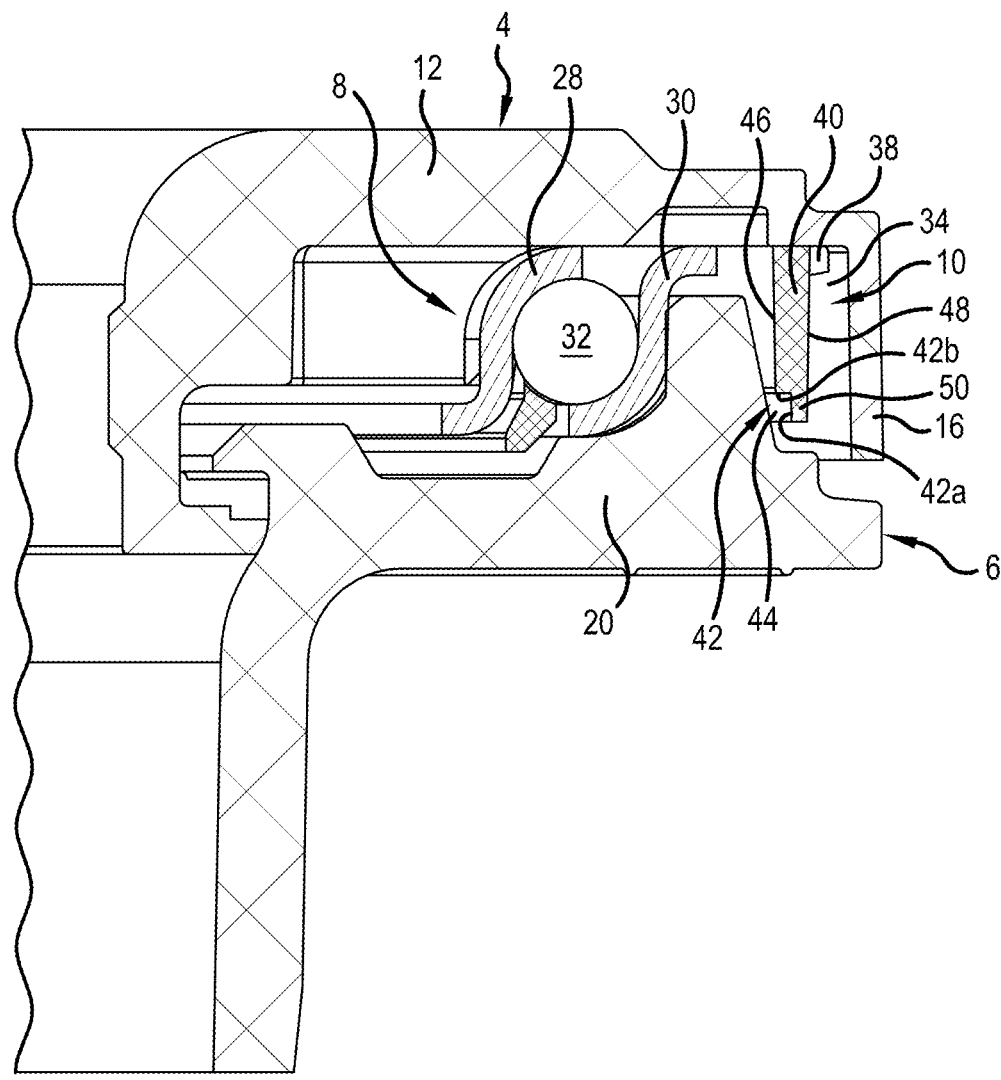
FIG. 2 is a detail view of a portion of FIG. 1.

As illustrated more clearly in FIG. 2, the gasket 10 comprises an annular heel 38 fixed on the upper bearing cap 4, and an annular sealing portion 40 extending from the heel 38 in the direction of the lower support cap 6.

A recess 42 is formed on the sealing portion 40 of the gasket 10 and is open towards the lower support cap 6.

There is an annular space between the recess 42 of the sealing portion 40 and the lower support cap 6. The recess 42 of the sealing portion 40 is filled with a lubricant 44 forming a seal by way of contact with the lower support cap 6. The lubricant 44 comes into contact with the lower support cap 6. The lubricant 44 comprises, for example, grease.

The lubricant 44 filling the recess 42 of the sealing portion 40 ensures good sealing properties between the sealing portion 40 of the gasket 10 and the lower support cap 6. The lubricant 44 also makes it possible to obtain a bearing unit 2 having a reduced friction torque.

The lubricant 44 closes the annular radial space that is between the sealing portion 40 of the gasket 10 and the lower support cap 6.

The sealing portion 40 of the gasket 10 extends in this case purely axially from the heel 38 of the gasket 10. In a variant, the sealing portion 40 of the gasket 10 can extend both axially towards the lower support cap 6 and radially inwards.

The sealing portion 40 of the gasket 10 is provided with a cylindrical axial inner surface 46 forming a bore and an opposite cylindrical axial outer surface 48. The inner surface 46 and the outer surface 48 delimit the radial thickness of the sealing portion 40 of the gasket 10.

The sealing portion 40 of the gasket 10 comprises an axial skirt 50 radially surrounding the recess 42 of the sealing portion 40, the axial skirt 50 forming a barrier stopping the contaminating particles that pass through the radial space 34 before they reach the recess 42 of the sealing portion 40.

The recess 42 of the sealing portion 40 is annular in this case. The recess 42 is delimited in the radial direction by an annular axial surface 42*a* of the sealing portion 40 and in the axial direction by an annular radial surface 42*b* of the sealing portion 40. The annular radial surface 42*b* radially outwardly continues the axial inner surface 46 of the sealing portion 40. The annular axial surface 42*a* axially continues a large-diameter edge of the annular radial portion 42*b* of the sealing portion 40 in the direction of the axial free end of the sealing portion 40. The axial surface 42*a* delimits the skirt 50 radially on the inner side.

The free end of the external skirt 16 of the upper bearing cap 4 is axially downwardly offset with respect to the free end of the sealing portion 40 of the gasket 10. The external skirt 16 of the upper bearing cap 4 thus forms a barrier stopping the contaminating particles that move towards the gasket 10.

In a variant, the sealing portion 40 may comprise a plurality of recesses 42 open towards the lower support cap 6, each recess 42 extending along a sector which is limited in the circumferential direction, the recesses 42 of the sealing portion 40 being formed at identical or different axial positions.

In the example shown, the recess 42 of the sealing portion 40 is formed at the free axial end of the sealing portion 40 of the upper bearing cap 10, the free axial end being opposite the heel 38 of the gasket 10, the recess 42 of the sealing portion 40 being open both radially inwards and axially towards the lower support cap 6.

In a variant, the recess 42 of the sealing portion 40 may be open solely radially inwards with respect to the lower support cap 6.

The gasket 10 may, for example, be made from an elastically deformable material, for example from nitrile or elastomer. The gasket 10 may also be made of a stiffer material, for example polyoxymethylene (POM) or steel.

Figure 3:
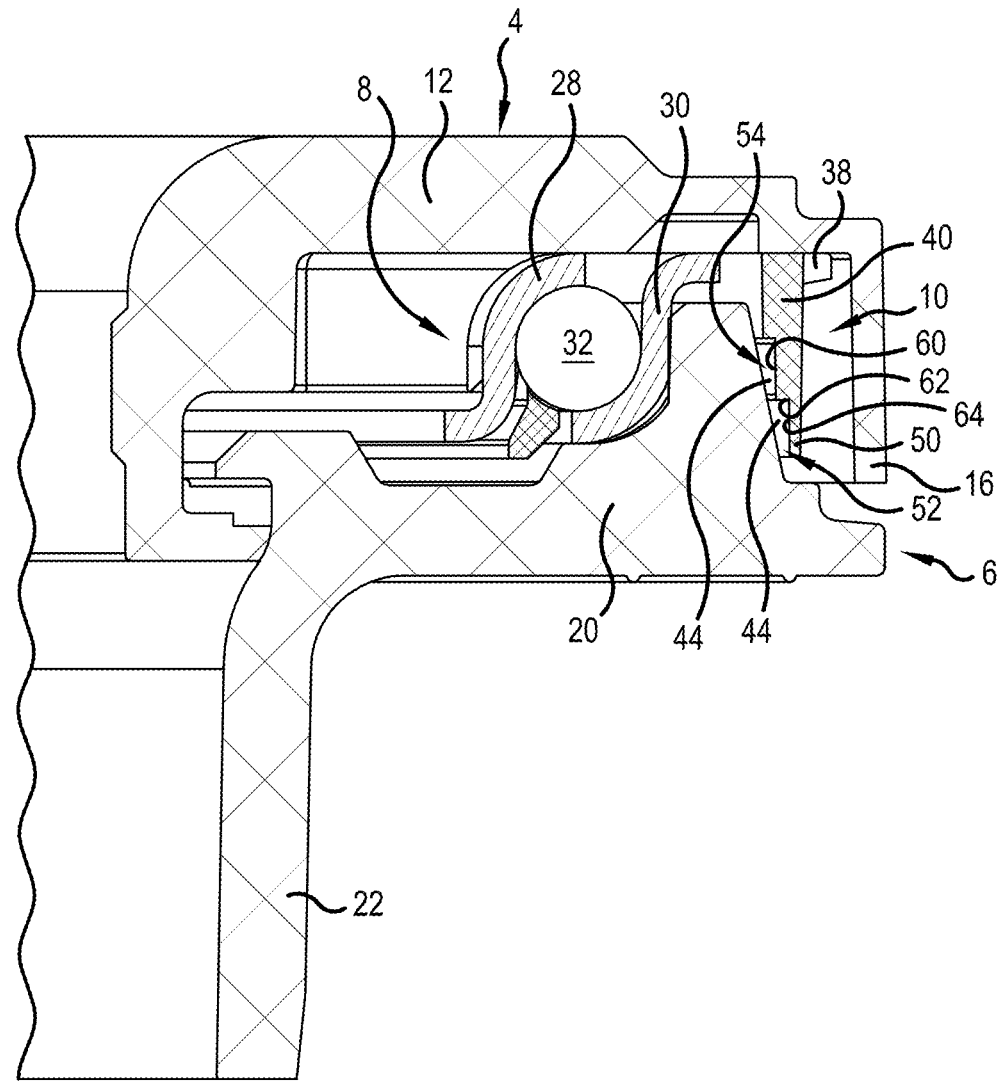
FIG. 3 is a view of a portion of a suspension bearing unit according to a second exemplary embodiment of the disclosure.

The exemplary embodiment illustrated in FIG. 3, in which identical elements bear the same references, differs from the preceding example in that the sealing portion 40 of the gasket 10 comprises a plurality of annular recesses 52, 54 open towards the lower support cap 6.

A first recess 52 and a second recess 54 are formed on the sealing portion 40 of the gasket 10 and filled with lubricant 44.

The second recess 54 is axially offset with respect to the first recess 52 on the side of the upper bearing cap 4.

The second recess 54 is radially offset with respect to the first recess 52 on the side of the lower support cap 6.

The first and second recesses 52, 54 follow one another directly in the axial direction. An annular axial surface 60 of the sealing portion 40 that delimits the second recess 54 in the radial direction extends from an annular radial surface 62 of the sealing portion 40 that delimits the first recess 52 in the axial direction.

An annular axial surface 64 of the sealing portion 40 that delimits the first recess 52 in the radial direction is radially outwardly offset with respect to the axial surface 60 of the sealing portion 40 that delimits the second recess 54 in the radial direction. The axial surface 60 axially continues a small-diameter edge of the radial surface 62, whereas the axial surface 64 axially continues a large-diameter edge of the radial surface 62.

In a variant, it is possible for the first and second recesses 52, 54 to not follow one another directly, that is to say to be axially spaced from one another, and/or the sealing portion 40 of the gasket 10 may comprise more than two recesses.

Figure 4:
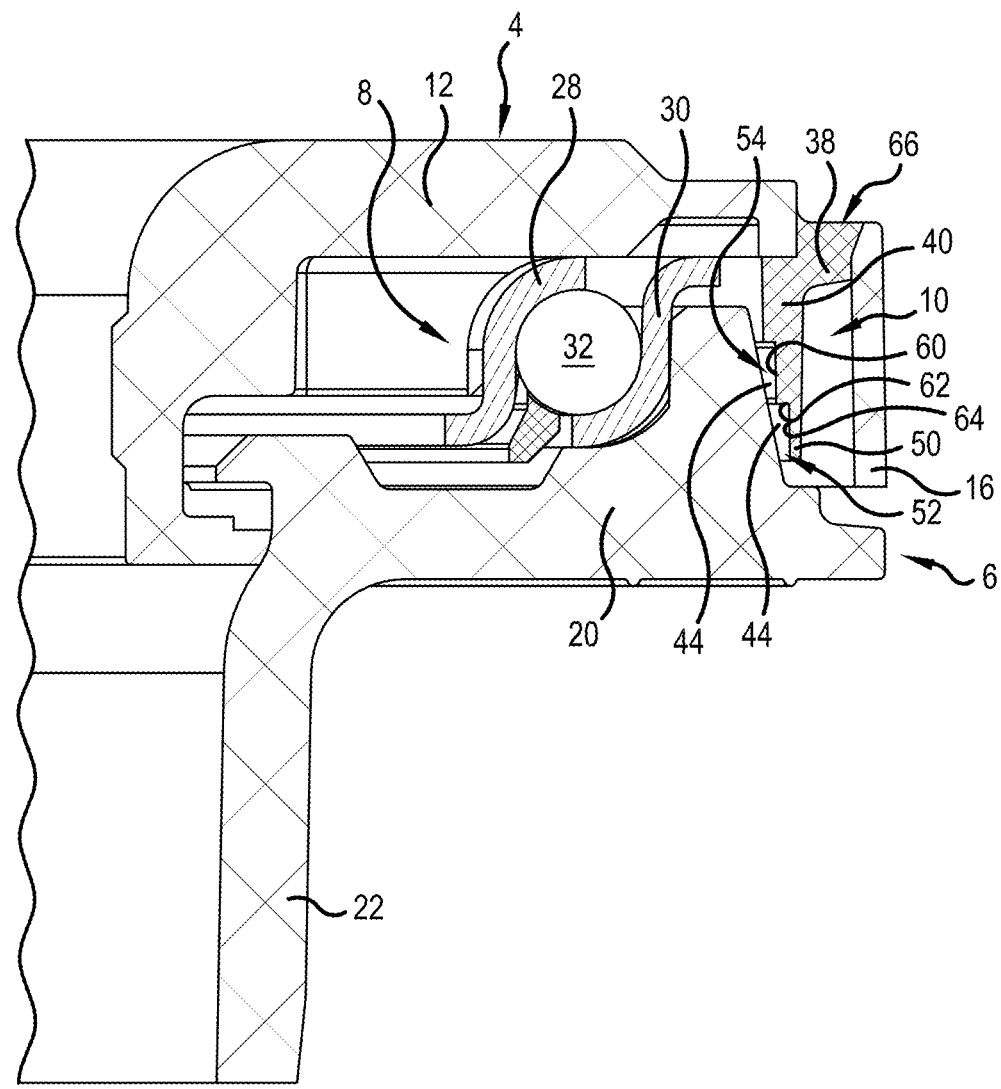
FIG. 4 is a view of a portion of a suspension bearing unit according to a third exemplary embodiment of the disclosure.

The exemplary embodiment illustrated in FIG. 4, in which identical elements bear the same references, differs from the second exemplary embodiment in that the external skirt 16 of the upper bearing cap 4 comprises through-holes 66 for the overmolding of the gasket 10.

The heel 38 of the gasket 10 is overmolded on the external skirt 16 of the upper bearing cap 4 so as to extend into the through-holes 66, improving the engagement of the heel 38 of the gasket 10 with the external skirt 16 of the upper bearing cap 4.

Figure 5:
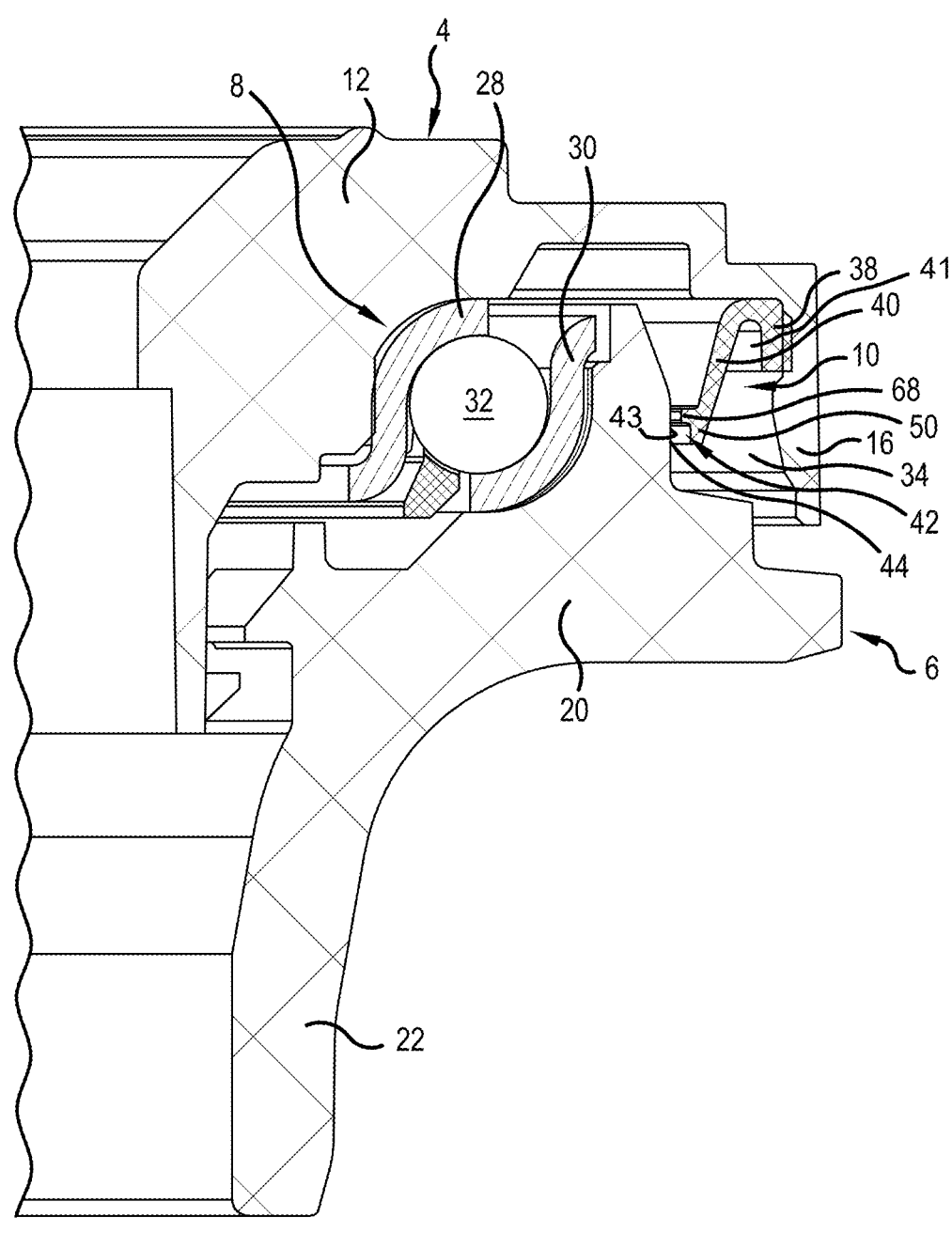
FIG. 5 is a view of a portion of a suspension bearing unit according to a fourth exemplary embodiment of the disclosure.

The exemplary embodiment illustrated in FIG. 5, in which identical elements bear the same references, differs from the first exemplary embodiment in that the heel 38 of the gasket 10 is fixed on the upper bearing cap 4 by radial interference with the external skirt 16. The heel 38 of the gasket 10 also includes a annular channel 41 facing axially away from an upper wall of the bearing cap 4

The sealing portion 40 of the gasket 10 extends in this case obliquely towards the lower support cap 6 from the heel 38 of the gasket such that it is conical and therefore may sometimes be referred to as a "conical sealing portion"

The sealing portion 40 of the gasket 10 comprises an annular bead 68 protruding radially towards a purely axial wall 43 of the lower support cap 6 while remaining at a radial distance therefrom. The bead 68 is axially offset from the free end of the sealing portion 40 of the gasket 10, the recess 42 being formed on the sealing portion 40 of the gasket 10 axially below the bead 68. In other words, the bead 68 axially delimits the recess 42 of the sealing portion 40. The inner surface of the sealing portion 40 radially delimits the recess 42 on the inner side.

The recess 42 of the sealing portion 40 is filled with lubricant 44 so as to form the seal with the lower support cap 6.

Advantageously, lubricant 44 is also disposed radially between the bead 68 and the outer surface of the lower support cap 6 in order to further improve the sealing of the bearing unit 2.

In a variant, the sealing portion 40 of the gasket 10 may comprise a plurality of beads 68 at various axial positions that protrude radially towards the lower support cap 6, and a plurality of radial recesses 42.

Figure 6:
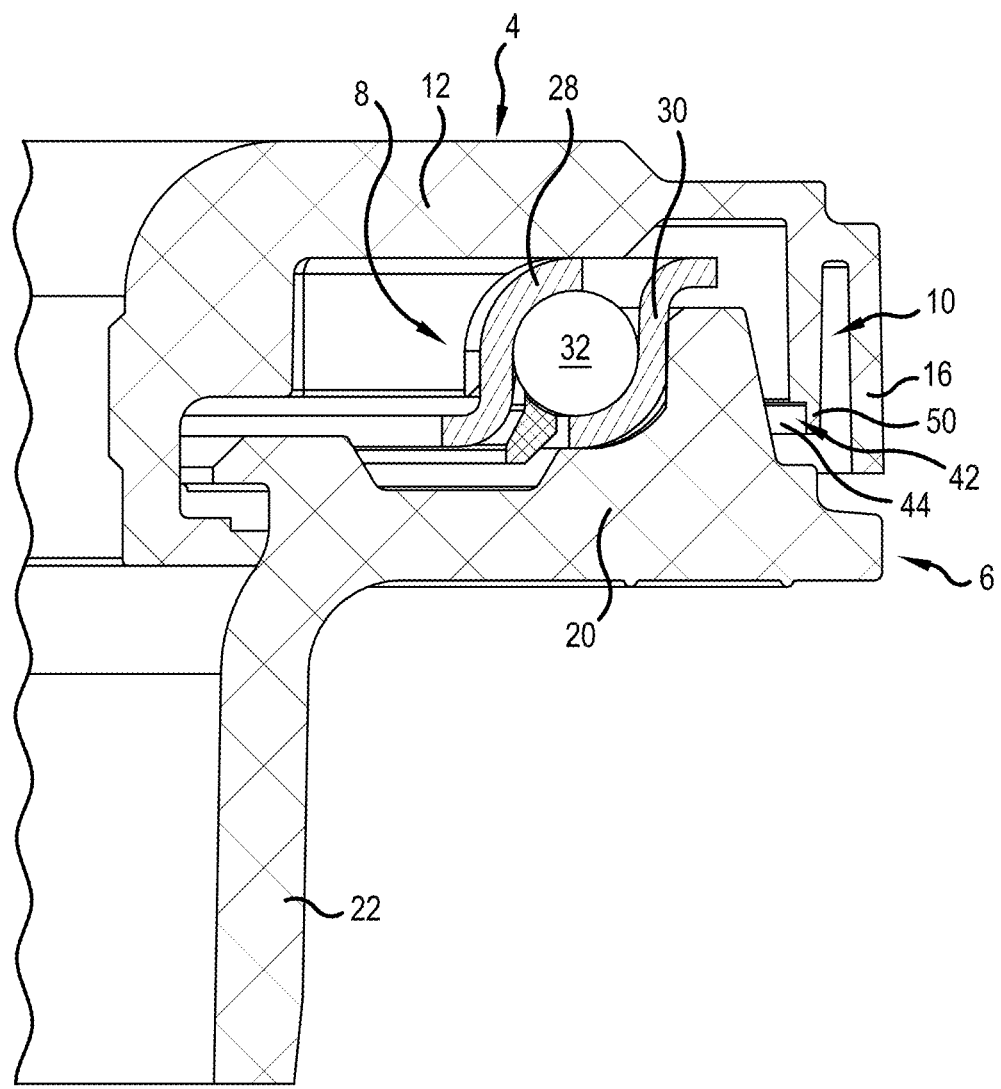
FIG. 6 is a view of a portion of a suspension bearing unit according to a fifth exemplary embodiment of the disclosure.

The exemplary embodiment illustrated in FIG. 6, in which identical elements bear the same references, differs from the first exemplary embodiment mainly in that the gasket 10 is in one piece with the external skirt 16 of the upper bearing cap 4, the gasket 10 and the external skirt 16 of the upper bearing cap 4 being made in a single piece.

In the exemplary embodiments illustrated, the unit 2 comprises a single external gasket 10 situated radially between the support cap 6 and the external skirt 16 of the upper bearing cap 4. Alternatively or in combination, the unit 2 may comprise an internal gasket 10 situated radially between the support cap 6 and the internal skirt 14 of the upper bearing cap 4.

In the exemplary embodiments illustrated, the unit 2 comprises a single external gasket 10 provided with a single sealing portion 40. In a variant, the unit 2 may comprise a plurality of external gaskets 10 or a single gasket 10 provided with a plurality of sealing portions 40.

In the exemplary embodiments illustrated, the gasket 10 is fixed on the upper bearing cap 4. As an alternative, the gasket 10 could be fixed on the lower support cap 6.

In the exemplary embodiments illustrated, the unit 2 comprises an angular contact rolling bearing 8 provided with a row of balls. The unit 2 may comprise other types of rolling bearings, for example a bearing of the four-point contact type and/or with at least two rows of balls. The rolling bearing may comprise other types of rolling elements 32, for example rollers. In another variant, the bearing of the unit 2 may comprise a sliding bearing devoid of rolling elements and provided with one or more rings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved suspension bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A suspension bearing unit comprising:
a lower support cap,
an upper bearing cap having a radially extending upper wall and an axial skirt depending from a radially outer end of the upper wall,
at least one bearing disposed radially between the lower support cap and the upper bearing cap, and
at least one gasket at least partially disposed in a space radially between the axial skirt and the at least one bearing,
wherein the at least one gasket includes an annular heel in contact with a radially inner surface of the axial skirt and a bottom surface of the upper wall,
wherein the at least one gasket includes a conical sealing portion extending from the annular heel to a free inner end spaced from the lower support cap,
wherein the sealing portion of the gasket comprises at least one bead spaced from the free inner end of the conical sealing portion, the at least one bead protruding radially toward the lower support cap, and
wherein the at least one bead and a part of the conical sealing portion between the at least one bead and the free inner end define at least one recess between the at least one gasket and the lower support cap.

2. The suspension bearing unit according to claim 1, including a lubricant in the at least one recess.

3. The suspension bearing unit according to claim 2, wherein the at least one bead comprises a single annular bead and wherein the at least one recess is annular.

4. The suspension bearing unit according to claim 1, wherein the at least one recess is open both radially and axially.

5. The suspension bearing unit according to claim 1, wherein the at least one gasket is overmolded on the upper bearing cap.

6. The suspension bearing unit according to claim 1, wherein the at least one gasket includes an annular channel facing axially away from the upper wall.

7. The suspension bearing unit according to claim 1, wherein the at least one bead is spaced from a purely axial wall of the lower support cap by a gap.

8. The suspension bearing unit according to claim 1, wherein the at least one bead and the free inner end are spaced from a purely axial wall of the lower support cap by a gap.

9. The suspension bearing unit according to claim 1, including a lubricant in the at least one recess,
wherein the at least one bead comprises a single annular bead and wherein the at least one recess is annular,
wherein the gasket includes an annular channel facing axially away from the upper wall, and
wherein the at least one bead is spaced from a purely axial wall of the lower support cap by a gap.

* * * * *